United States Patent [19]

Miedel

[11] 4,408,260
[45] Oct. 4, 1983

[54] TENT CONSTRUCTION HAVING ILLUMINATING MEANS

[76] Inventor: Roland E. Miedel, 604 Seminole Ave., Fox Chase Manor, Philadelphia, Pa. 19111

[21] Appl. No.: 234,301

[22] Filed: Feb. 13, 1981

[51] Int. Cl.³ .............................................. F21V 7/04
[52] U.S. Cl. ..................................... 362/32; 362/145; 362/190; 362/208; 135/114; 135/119; 248/188
[58] Field of Search ................. 362/32, 145, 152, 216, 362/190, 208, 102; 135/87, 101, 114, 119, 905; 248/188, 345

[56] References Cited

U.S. PATENT DOCUMENTS

| | | | |
|---|---|---|---|
| 373,378 | 11/1887 | Rumrille | 135/114 X |
| 941,458 | 11/1909 | Leach | 135/114 X |
| 1,214,979 | 8/1929 | Von Ahnen | 135/108 |
| 1,765,911 | 6/1930 | Fabianke | 362/145 |
| 2,245,349 | 6/1941 | Lombardi | 362/32 |
| 2,372,471 | 3/1945 | Campbell | 362/102 |
| 3,275,815 | 9/1966 | Golaz | 240/6.42 |
| 3,544,782 | 12/1971 | Hahn | 240/2 |
| 3,870,062 | 3/1975 | Medlin | 135/20 M |
| 4,120,024 | 10/1978 | Aizenberg et al. | 362/216 X |
| 4,129,311 | 12/1978 | Hodgson et al. | 280/11.37 E |

FOREIGN PATENT DOCUMENTS 1142842 of 0000 United Kingdom .

Primary Examiner—Peter A. Nelson
Attorney, Agent, or Firm—John W. Logan, Jr.

[57] ABSTRACT

A tent construction having a source of illumination built within the structural framework of the tent.

7 Claims, 7 Drawing Figures

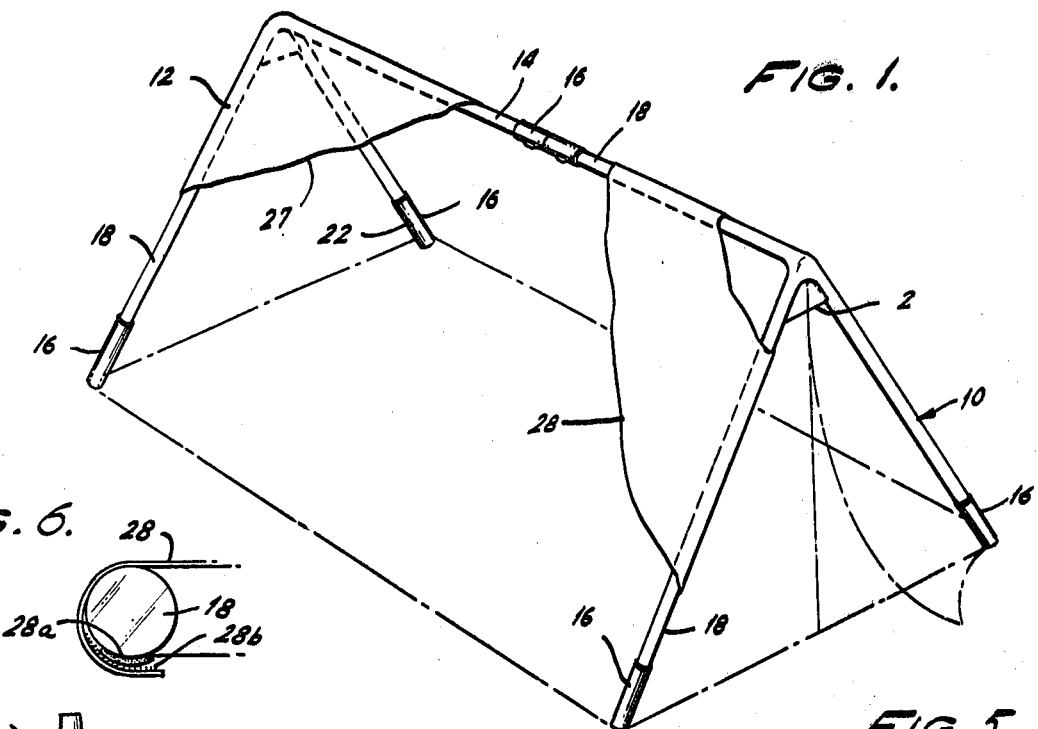
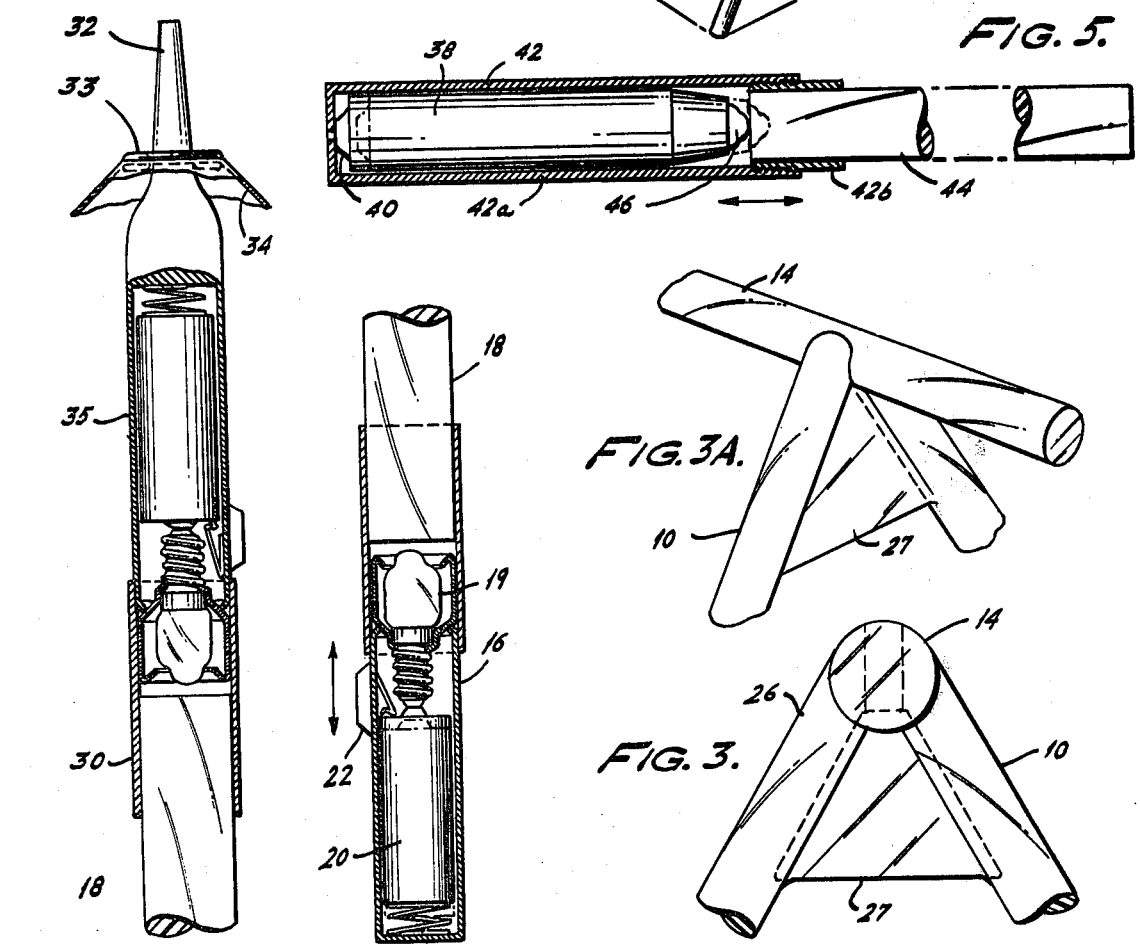

4,408,260

TENT CONSTRUCTION HAVING ILLUMINATING MEANS

TECHNICAL FIELD

The present invention relates, in general, to tent constructions and, in particular, to a structural tent member which also serves as a source of illlumination within a tent. This application is a continuation-in-part application of U.S. Ser. No. 189,549, filed Sept. 22, 1980, now abandoned.

BACKGROUND ART

Campers and soldiers are very familiar with the problem of providing adequate illumination in a tent. Typically, flashlights or fuel burning lanterns are used. In some instances, the flashlight or lantern is placed on the ground or propped against a tent pole or other structural member. Other times, the camper improvises by somehow hanging the light source at some point within the tent. The shortcomings and disadvantages of such arrangements are readily apparent. Movements within the limited space of a tent may cause injury the camper if he hits the light source or may cause the light source to be knocked over. A fuel burning lantern has the additional hazards of fire and offensive odors.

U.S. Pat. No. 1,765,911 shows a tent pole construction having a light source fixed to the outside surface of the pole and the power supply for the light source housed within the pole. While such an arrangement solves some of the problems identified above, this particular construction presents a certain hazard to the camper who accidentally comes into contact with the sparp edges of a ligh reflector. Also, the light source is exposed to breakage by movements of the camper within the tent or in transporting the tent. Removal of the light source while the tent is being moved increases the risk of losing the slight source.

DISCLOSURE OF THE INVENTION

Accordingly, an objective of the present invention is to provide a new and improved tent construction in which a source of illumination is built into the structural framework of the tent.

It is another objective of the present invention to provide a tent construction which overcomes the problems of providing adequate illumination in a tent.

It is a further objective of the present invention to provide a tent construction which is relatively inexpensive to fabricate.

It is yet a further objective of the present invention to provide a tent construction which is easy to assemble or transport.

A tent, constructed in accordance with the present invention, comprises a structural framework composed of a plurality of structural members, at least one of which has a housing and an elongated transparent light pipe extending away from the housing. Such a tent also includes a light source within the housing for introducing light into the transparent light solid posts for passage along the light solid posts. A battery unit, also located within the housing, powers the light source. Switch means are provided in the housing for selectively connecting the battery unit to the light source. A covering is fitted over the structural framework to form a shell. The tent cover is secured to the tent posts so that a portion of the peripheral surface of the tent posts is exposed to transmit light to the interior of the tent.

BRIEF DESCRIPTION OF THE DRAWINGS

Referring to the drawing:

FIG. 1 is a perspective view, partially broken away, showing a tent constructed in accordance with the present invention;

FIG. 2 is an enlarged sectional view of a portion of the structural framework of the FIG. 1 tent showing the details of one lighting arrangement according to the present invention;

FIG. 3 is an enlarged sectional view showing the manner in which two of the structural members of the FIG. 1 tent may be assembled together;

FIG. 3A is a perspective view of a modification of the FIG. 3 assembly;

FIG. 4 is a sectional view of the FIG. 2 lighting arrangement installed in a different tent structural member;

FIG. 5 is a sectional view of a second lighting arrangement according to the present invention; and FIG. 6 is a sectional view through one tent post illustrating a preferred means for securing the tent cover to the post.

BEST MODE OF CARRYING OUT THE INVENTION

Referring to FIGS. 1 and 2, a tent, constructed in accordance with the present invention, includes a structural framework composed of a plurality of structural members 10, 12 and 14. In particular, structural members 10 and 12 are shown as inverted V components and structural member 14, serving as a ridge pole, is a straight component.

Each of the structural members 10, 12 and 14 is composed of a housing 16 and an elongated transparent light solid post 18 extending away from the housing. Light solid posts 18 have the characteristic of transmitting along the length of the solid posts light introduced at one end. Materials, such as acrylics, exemplified by plexiglass or lucite, may be used as the light solid posts. Instead of forming structural members 10 and 12 from one piece of light solid posts material, each may be composed of two light solid posts components suitably joined together at their tops.

Positioned within each housing 16 is a light source 19 for introducing light into the light solid posts associated with the particular housing. A battery unit 20 also is located within housing 16 for powering light source 19. Battery unit 20 and light source 19 are selectively connected through a switch 22. The arrangement is generally similar to a conventional flashlight.

Housing 16 in ridge pole 14 is bidirectional. By being located in the middle of the ridge pole, two light sources in two housings, joined together at their free ends and disposed in opposite directions, may be provided to illuminate the two sections of transparent light piping.

FIG. 3 shows one arrangement for securing ridge pole 14 to inverted V components 10 and 12. The ends of ridge pole 14 are provided with slots which tightly fit into corresponding slots in the apex 26 of the components 10 and 12, whereby the elongated ridge pole is coupled to components 10 and 12. To enhance the coupling, other arrangements, such as mechanical fasteners, may be employed. To provide an added degree of strength and rigidity, components 10 and 12 have a web 27 between the two legs at the apex 26.

A tent, constructed in accordance with the present invention, also includes a covering 28 fitted over the structural framework to form a shell. Covering 28 may be the usual convas material used in tents. If needed, suitable means such as ribbon strips on the inside surface of the tent covering may be used to secure the covering to the framework.

A preferred form of securing the tent cover 28 to the tent posts 18 is illustrated in FIG. 6. In this embodiment, the tent cover 28 is wrapped approximately 180° about the tent post and held in this position by a suitable fastener. The fastener may consist of a narrow strip of material 28a adhesively secured to the post 18 and having a series of small rigid hooks projecting from its exposed face. Similarly, a second strip of material 28b is stitched or otherwise secured to an edge of the tent cover 28, which has a series of loops on its exposed face adapted to engage the hooks of the strip 28a to releasably secure the tent cover in place to the supporting tent posts. This permits approximately one-half of the post surface to be exposed to the interior of the tent for the purpose of transmitting light to the interior of the tent.

FIG. 3A shows a modification to the FIG. 3 assembly. In FIG. 3A, ridge pole 14 is provided with an extension which projects outside the tent shell so that the outside of the tent is illuminated.

It should be noted that only a selected one or more structural members need be arranged with an illumination feature. For example, two oppositely disposed lights in ridge pole 14 may be adequate for the type of tent illustrated in FIG. 1. Also, the incorporation of a light source in a structural member of a tent may be applied to members other than the ones illustrated in FIG. 1. For example, FIG. 4 shows a tent pole 30 of the type arranged to be disposed vertically along the centerline of the tent. The bottom end (not shown) of the tent pole is placed on the ground and the top end has a tip 32 which is received by a reinforced opening 33 in the tent covering 34. Housing 35 is arranged similar to housing 16.

FIG. 5 shows a second embodiment of a lighting arrangement, which may be used in the present invention. In this arrangement, a self-contained flashlight 38 having a push button switch 40 is held within a two-part housing 42. After flashlight 38 is placed in part 42a, part 42b is threaded into part 42a to captivate the flashlight. A transparent light solid posts 44 fits in part 42b with sufficient clearance to permit sliding within part 42b. Upon engaging lens 46 of flashlight 38 through movement of the light solid posts to the left, the light solid posts causes the entire flashlight to move to the left from the position shown by the dashed lines to the position shown in solid lines. This causes switch 40 to be depressed to turn on the flashlight. A second similar movement of light solid posts 44 depresses switch 40 to turn off the flashlight.

While in the foregoing there have been described preferred embodiments of the invention, it should be understood to those skilled in the art that various modifications and changes can be made without departing from the true spirit and scope of the invention as recited in the claims.

I claim:

1. A tent comprising
    a structural framework composed of a plurality of structural members, the members having a housing and an elongated transparent solid, rigid light post extending away from said housing;
    a light source within said housing for introducing light into said transparent light post for passage a through said light post;
    a battery unit within said housing for powering said light source;
    switch means in said housing for selectively connecting said battery unit to said light source;
    a covering fitted over said structural framework to form a shell;
    means releasable securing said covering to said structural framework to expose the surface of said structural framework to the interior of said tent; said securing means comprising two mating releasable engaging strips, one secured longitudinally of the structural framework, and the other secured to the tent covering and exposing the inner approximate half of said framework to the interior of said tent; and
    a ridge pole comprising light posts and bidirectional illumination means contained in the middle of said pole, said pole fruther containing slots near the ends of said light posts, said slots tightly fitting with slots formed at the apex of the other structural members, and a web between the members for structural support at said apex.

2. The tent of claim 1 wherein a one said members has a second housing, a said elongated transparent solid rigid light post extending therefrom.

3. The tent of claim 2 wherein two of said members are elongated transparent solid, rigid light posts joined together at their ends opposite from said housings.

4. The tent of claim 3 wherein some of said member are formed of a single piece of material in a "V" configuration.

5. The tent of claim 4 wherein the free end of said housing of said one member has a tip which extends through an opening in said covering.

6. The tent of claim 5 wherein said ridge pole bidirectional illumination means includes a pair of housings joined together at their free ends.

7. The tent of claim 5 wherein said V configuration of said members is formed at each end of said tent.

* * * * *